(12) United States Patent
Zepeda-Rosales

(10) Patent No.: US 12,447,073 B1
(45) Date of Patent: Oct. 21, 2025

(54) GURNEY SYSTEM FOR TRANSPORTING INJURED PERSONS

(71) Applicant: Miguel Zepeda-Rosales, Santa Barbara, CA (US)

(72) Inventor: Miguel Zepeda-Rosales, Santa Barbara, CA (US)

( * ) Notice: Subject to any disclaimer, the term of this patent is extended or adjusted under 35 U.S.C. 154(b) by 0 days.

(21) Appl. No.: 18/934,182

(22) Filed: Oct. 31, 2024

(51) Int. Cl.
| | | |
|---|---|---|
| *A61G 1/02* | (2006.01) | |
| *B60K 1/04* | (2019.01) | |
| *B60K 7/00* | (2006.01) | |
| *B60K 17/04* | (2006.01) | |
| *B60K 26/02* | (2006.01) | |
| *B60T 1/06* | (2006.01) | |
| *B60T 7/08* | (2006.01) | |
| *B62D 24/02* | (2006.01) | |
| *B62D 1/02* | (2006.01) | |

(52) U.S. Cl.
CPC ......... *A61G 1/0225* (2013.01); *A61G 1/0275* (2013.01); *A61G 1/0287* (2013.01); *B60K 1/04* (2013.01); *B60K 7/0007* (2013.01); *B60K 17/046* (2013.01); *B60K 26/02* (2013.01); *B60T 1/065* (2013.01); *B60T 7/08* (2013.01); *B62D 24/02* (2013.01); *B60K 2001/045* (2013.01); *B62D 1/02* (2013.01)

(58) Field of Classification Search
CPC .. A61G 1/0225; A61G 1/0275; A61G 1/0287; B60K 1/04; B60K 7/0007; B60K 17/046; B60K 26/02; B60K 2001/045; B60T 1/065; B60T 7/08; B62D 24/02; B62D 1/02
See application file for complete search history.

(56) References Cited

U.S. PATENT DOCUMENTS

| | | | |
|---|---|---|---|
| 2,999,555 A | 9/1961 | Stroud et al. | |
| 3,135,346 A | 6/1964 | Bertozzi | |
| 3,212,595 A | 10/1965 | Mathews et al. | |
| 4,589,508 A | 5/1986 | Hoover et al. | |
| 6,390,213 B1 * | 5/2002 | Bleicher | A61G 1/0218 280/124.179 |
| 6,470,981 B1 * | 10/2002 | Sueshige | B60K 7/0007 180/65.6 |
| 6,698,811 B1 | 3/2004 | Schuchman | |
| 7,017,939 B2 * | 3/2006 | Darling, III | B62B 1/002 280/646 |
| 7,191,854 B2 | 3/2007 | Lenkman | |

(Continued)

*Primary Examiner* — Kevin Hurley
*Assistant Examiner* — Marlon A Arce
(74) *Attorney, Agent, or Firm* — Sierra IP Law, PC; William K. Nelson

(57) ABSTRACT

A motorized stretcher system designed for efficient and secure transport of injured individuals across uneven surfaces. The system comprises a litter secured to a suspension frame, which is connected to a central hub housing a motor, tire, brake rotor, and caliper. The litter is contoured to safely hold an injured person, with adjustable ratchet straps and side rails providing additional security. The motor, controlled via a throttle and directional switch, drives the tire to propel the stretcher in multiple directions. A suspension system, incorporating multiple dampers, absorbs vibrations and stabilizes the litter across uneven surfaces. Powered by a battery assembly, the motor provides sufficient torque to traverse challenging environments while ensuring smooth and controlled transport.

20 Claims, 11 Drawing Sheets

(56) References Cited

U.S. PATENT DOCUMENTS

| | | | |
|---|---|---|---|
| 7,793,744 B1 | 9/2010 | Hardie | |
| 8,442,738 B2 | 5/2013 | Patmore | |
| 8,613,455 B2 | 12/2013 | Berrett et al. | |
| 8,756,726 B2 | 6/2014 | Hamberg et al. | |
| 9,944,313 B2 | 4/2018 | Raspanti et al. | |
| 11,084,515 B2* | 8/2021 | Dettner | B62B 5/0046 |
| 11,254,341 B2 | 2/2022 | Carlson et al. | |
| 11,878,581 B1* | 1/2024 | Simmons | B60K 7/0007 |
| 2004/0084864 A1 | 5/2004 | Casey et al. | |
| 2010/0294575 A1 | 11/2010 | Martel | |
| 2014/0166378 A1* | 6/2014 | Mair | H02K 7/116 180/65.6 |
| 2015/0298537 A1* | 10/2015 | Duhamel | H02K 9/16 301/6.5 |
| 2019/0308686 A1* | 10/2019 | Hendey | B62K 11/02 |
| 2021/0121337 A1 | 4/2021 | Talati et al. | |
| 2022/0258782 A1 | 8/2022 | Schambach et al. | |
| 2023/0303154 A1* | 9/2023 | Rabson | B60K 7/0007 |

\* cited by examiner

GURNEY SYSTEM FOR TRANSPORTING INJURED PERSONS

FIELD OF THE INVENTION

The present invention relates to a gurney system operable to transport injured persons. More particularly, the invention relates to a gurney system having a motorized litter and a suspension system to facilitate the controlled movement of injured persons in need of assistance.

BACKGROUND OF THE INVENTION

The transportation of injured persons is an essential part of medical care and disaster response. In particular, injured persons found within hazardous or dangerous terrain require specialized gurneys or stretchers. These gurneys and frames are generally known as litter support frames generally used to transport injured persons during search and rescue missions or disaster response. Traditional litter support frames require manual effort, thereby making the transport of injured persons more difficult.

It is an object of the present invention to provide a gurney system operable to transport injured persons with motorized capabilities along with a gear hub assembly and a stability assistance system.

SUMMARY OF THE INVENTION

The present invention relates to a motorized gurney system, designed for transporting injured persons efficiently across various terrains, including rough or uneven surfaces. The invention, embodied in various configurations, features a suspension frame coupled with a powered hub system, offering enhanced control, stability, and maneuverability in rescue scenarios. A suspension frame that houses a litter where the injured person is secured. This suspension frame may include multiple dampers positioned around its perimeter to absorb vibrations and provide a critically damped system, ensuring that the litter maintains its orientation during movement. The dampers may be part of a multi-axis vibration management system that offers a significant advantage by preventing oscillation in the x, y, and z directions, even when the gurney system moves over rough surfaces or terrain. The litter may be also be designed as to hold the injured person securely with a contoured surface and perimeter side rails to prevent falls during movement. The system may also include ratchet straps around the perimeter of the litter to secure the person in place, with adjustable tension control for different body sizes. The suspension frame may improve the comfort and safety of the injured person by stabilizing the litter, even when the system traverses uneven surfaces such as gravel, mud, or inclines.

The suspension frame may be designed to enhance stability and absorb vibrations. It may be constructed from durable materials like aluminum, titanium, and carbon fiber, ensuring both strength and lightweight maneuverability essential for rescue operations. The suspension frame may have handles for the user to grasp and control the movement of the gurney system.

The suspension frame may be mechanically secured to a central hub, which integrates a motor, tire, and planetary gear train. The planetary gear system allows for high torque output while reducing motor speed, which is essential for carefully traversing challenging environments at low speed, such as inclines or soft, uneven surfaces like sand or gravel. This feature provides a smooth and controlled movement over rough terrains, while an electronic controller (e.g., a digital controller) offers speed regulation, ranging from slow careful maneuvers to more rapid transport at lower torque in less challenging terrain. The controls may include a switch that toggles between a high torque/low speed mode and a low torque/high speed mode. The ability to adjust torque output based on environmental conditions allows for adaptability during rescue operations.

In some embodiments, the motor housed in the central hub drives a tire to propel the gurney system forward, backward, and in other directions. The motor can be a gearhead motor, brushless DC motor, or servo motor, providing sufficient torque to navigate difficult environments. The gurney system may be powered by a battery assembly housed within the frame and in electrically communication with the motor and motor controller. The battery assembly may be compact and designed to be easily replaceable. The batteries may be selected for their durability and efficiency, enabling extended use in rescue or medical situations. The battery assembly may include a battery redundancy system to allow continuous functionality and extended operational time, even if individual batteries deplete or fail. This system can operate in either a parallel or series-parallel configuration, providing flexibility in power management. The controller may monitor each battery voltage, temperature, and overall health, and it manages load balancing to prevent excessive draw from any one battery. The controller may provide efficient power cycling among batteries, further extending operational time by drawing primarily from the batteries with the highest charge levels. When a battery reaches a low charge threshold, the controller may automatically isolate it from the network and reroutes power from the remaining batteries, ensuring minimal disruption in power delivery.

To control the battery assembly and motor in the versatile gurney system, several types of controllers can be implemented, operable to control motor types like gearhead motors, brushless DC motors, and servo motors. For brushless DC motors, an Electronic Speed Controller (ESC) may be used to manage motor speed, direction, and braking. ESCs provide precise speed control and efficient operation with minimal heat generation, and are operable to deliver robust, continuous power necessary for safe and controlled stops in varied environments. For gearhead and servo motors, Pulse Width Modulation (PWM) controllers may be implemented and control over speed and torque by adjusting the PWM signal's duty cycle, enabling responsive handling for smooth acceleration, deceleration, and directional changes essential for maneuvering in rescue scenarios. A Programmable Logic Controller (PLC) with integrated motor control, particularly suitable for systems needing multi-directional movement and load management. PLCs are highly programmable and adaptable across motor types, making them ideal the gurney system, which must navigate tight spaces or difficult terrain. Additionally, a Battery Management System (BMS) with integrated motor control can be used in systems with redundant battery setups, optimizing power distribution and motor control. The BMS may continuously monitors battery health and dynamically allocates power based on capacity, ensuring seamless operation even as individual batteries deplete. Real-time monitoring capabilities allow the BMS to adjust motor power output according to current load demand and battery status, which is crucial for prolonged rescue operations where efficient power use is essential.

The motorized hub assembly also includes a braking system consisting of a brake rotor and caliper, which ensures quick and controlled stopping. The brake mechanism is operable via a brake control positioned on the handles of the system, providing user-controlled braking while simultaneously disengaging the motor to prevent unwanted motion. This dual functionality offers enhanced safety and precision during the transport of injured persons.

The system may also include a motor controller configured to interface with a throttle, directional switch, and brake lever, each situated on or near the handles of the suspension system to provide users with precise control over the speed and direction of the gurney. The throttle may be implemented as a traditional wired interface, a wireless throttle, or a mobile application-based throttle, allowing for flexible installation and remote operation. Each throttle version enables programmable speed response curves, allowing users to select or customize acceleration profiles based on different use scenarios or operator preferences. For instance, the motor controller can dynamically adjust acceleration rates for smoother, gradual speed increases, or quicker response curves for rapid acceleration needs. In configurations with programmable throttles, the motor controller may store multiple speed response settings, accessible via pre-set buttons or an application interface, facilitating quick selection of modes suited to specific environments or user experience levels.

Additionally, the motor controller is in electronic communication with the motor and user controls, adjusting the system's speed and directional movement (e.g., forward and reverse) in real-time based on throttle input. The braking mechanism, consisting of a brake rotor and caliper, integrates with the motor controller to provide proportional deceleration, further enhancing user control over the gurney's movement in diverse operational contexts.

In some embodiments, the gurney system may include a stability assistance system, with sensors such as gyroscopes and accelerometers that detect and adjust the litter's orientation relative to the ground in real time. This system helps maintain the litter's horizontal alignment relative to the ground, even at higher speeds or over uneven surfaces, ensuring a smooth and stable transport. The system may be able to self-adjust and stabilize during movement over uneven ground further enhancing safety for the injured person transported in a rescue operation over difficult terrain.

In summary, the gurney system may include a motorized hub with planetary gear system, vibration damping suspension frame, integrated braking and motor control system, and the stability assistance technology, all working together to provide a safe and efficient solution for transporting injured persons across challenging terrains. The system may be highly adaptable and may ensure both comfort and safety for the injured person, while reducing the physical strain on the operator.

The gurney system has a tire mounted to a planetary gear hub forming a motor wheel assembly. A brake rotor and a brake caliper may be mechanically engaged to the motor wheel assembly, e.g., via a planetary gear hub. Controls for the motor and the brake may be positioned in a convenient location on the gurney system to allow the user to comfortably control the movement of the gurney. A brake control, forward and reverse switches, and throttle levers may be positioned on or near the handles to enable the user to adjust speed and direction of motion without having to release the handles.

It is an aspect of the present invention to provide a gurney system having a suspension frame operable to reduce vibrations, the frame having a pair of first supporting plates, a pair of second supporting plates, a plurality of dampers positioned around the perimeter of said frame, each of said plurality of dampers being connected to either one of said first supporting plates or one of said second supporting plates; a litter operable to secure injured persons where the litter comprises a handle with a plurality of controls; a mounting plate secured to the litter; a plurality of side frames where each side frame has a distal end and a proximal end, where the distal end is connected to a central hub and the proximal end is connected to the mounting plate; a battery shelf assembly secured within at least one of the plurality of side frames; a motor controller secured within one of the plurality of side frames; a central hub connected to at least one of the plurality of side frames, where the central hub comprises of a tire, a brake assembly, and a motor, wherein the controls on the litter are in electronic communication with the motor controller and the motor controller is in electronic communication with the motor within the central hub such that it can control the motor to thereby move litter in a plurality of directions.

It is a further aspect of the present invention to provide a method for transporting an injured person within a gurney system, where the method comprises placing an injured person within a litter frame, where the litter frame has a handle to operate the gurney system, where the handle includes a directional switch, a throttle lever, and a brake lever; securing the injured person using a plurality of ratchet straps positioned around the perimeter of the litter; activating a directional switch in electrical communication with a motor controller; transmitting a control signal from the motor controller to a motor within a central hub having a tire and a brake rotor; engaging the throttle lever to rotate the motor in a selected direction to move the gurney system.

It is a further aspect of the present invention to provide a device for transporting injured persons where the device includes a suspension frame having a pair of first supporting plates positioned at opposite ends of the frame, a pair of second supporting plates positioned in between the pair of first supporting plates, a plurality of dampers positioned around the perimeter of the frame, where each of the plurality of dampers are connected to either of the pair of first supporting plates or the pair of second supporting plates; a litter positioned within said suspension frame being operable to support an injured person and a handle with a directional switch, a throttle lever, and a brake lever; a mounting plate positioned beneath the litter; a plurality of ratchet straps secured around the perimeter of the mounting plate, where each ratchet strap has a strap and a ratchet mechanism; a pair of hollow side frames having a distal end and a proximal end, the pair of side frames extending laterally downwards from the suspension frame; a central hub secured to a distal end of the pair of side frames, where the central hub has a tire, a rotor, a brake rotor, and a brake caliper; a motor controller operably mounted to at least one of the pair of side frames, where the motor controller is in communication with the motor; a battery shelf assembly mounted to at least one of the pair of side frames, where the battery shelf assembly is operably in communication with the motor controller.

It is an object of the present invention to provide a device operable to transport injured persons on uneven surfaces.

It is an object of the present invention to provide a gurney system operable to provide stability during transport.

It is an object of the present invention to provide a motorized gurney system that can be maneuvered by a single operator.

It is an object of the present invention to provide a gurney system operably capable of absorbing vibrations and shocks when traversing uneven surfaces.

The above-described objects, advantages, and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Figure 1:
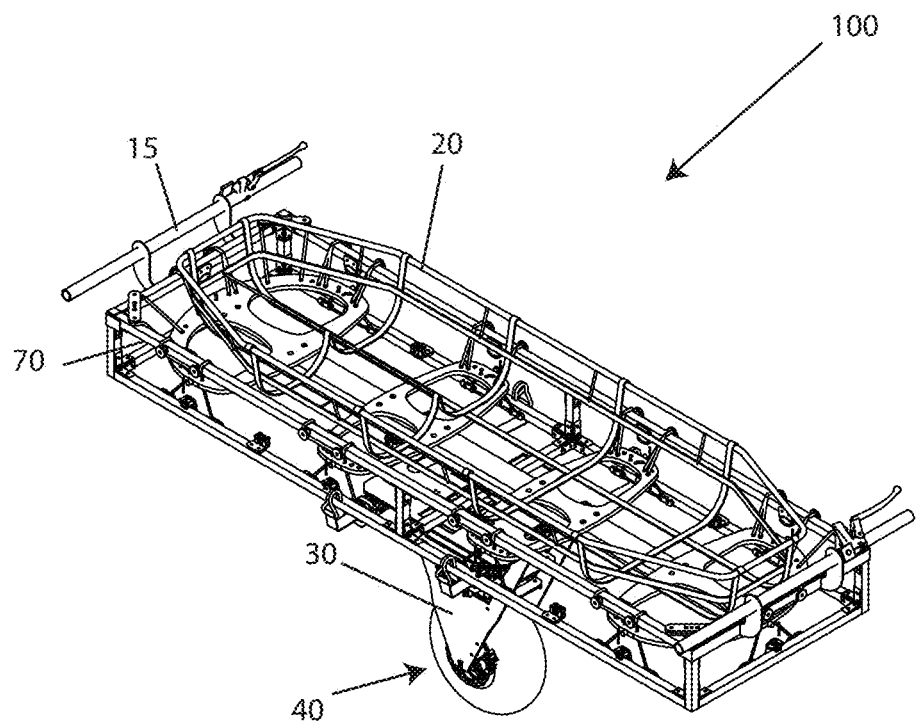
FIG. 1 provides a perspective view of the gurney system, according to an embodiment of the present invention.
Figure 2:
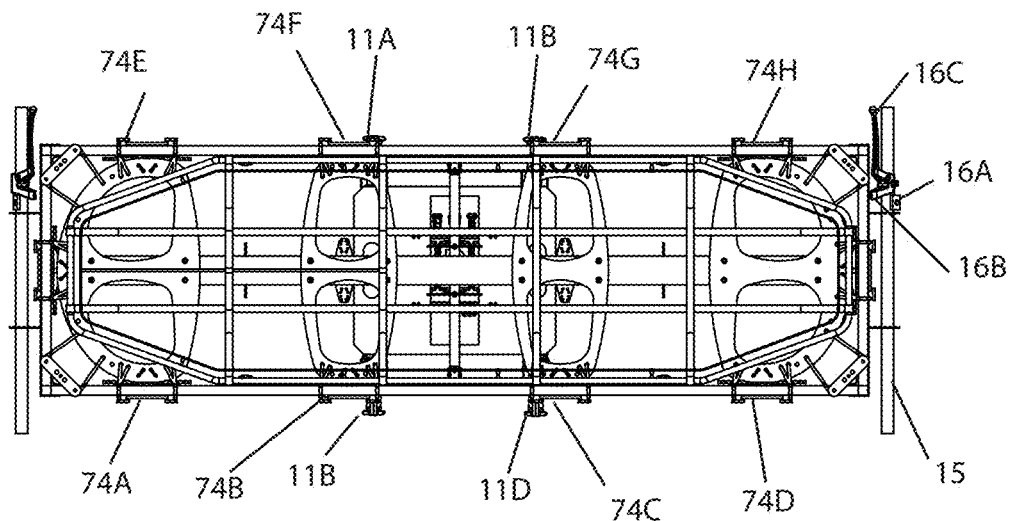
FIG. 2 provides a top view of the gurney system, according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Referring to the drawings, wherein like reference characters designate like or corresponding parts throughout the several views, and referring particularly to FIGS. 1-20, it is seen that the present invention includes various embodiments of a gurney system having a suspension frame, the frame being operable to transport injured persons from rough surfaces or terrain.

Figure 5:
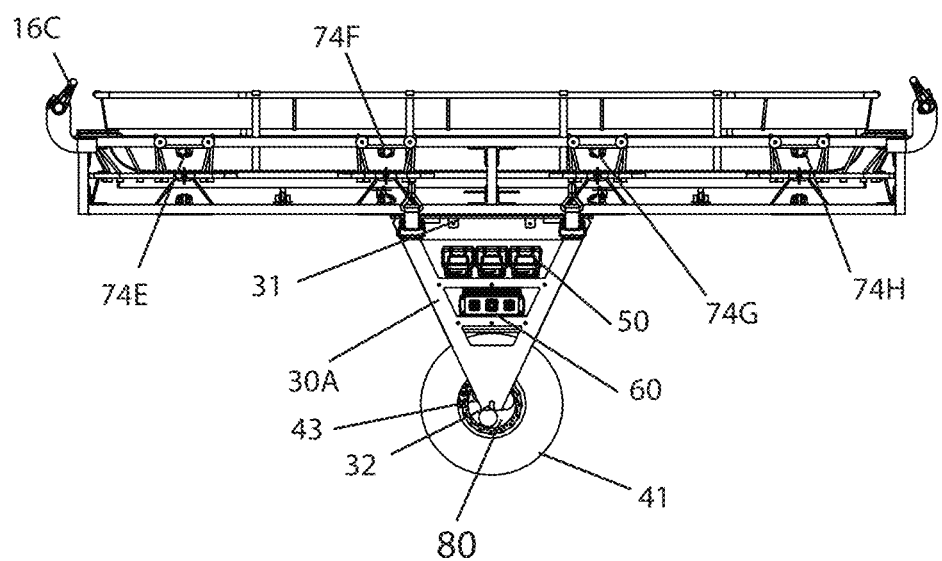
FIG. 5 provides a second side view of the gurney system, according to an embodiment of the present invention.

The present invention concerns a gurney system 100 having a litter 20 positioned within a suspension frame 70, a mounting plate 10 secured beneath the frame 70, plurality of side frames 30 (30A, 30B) secured to the mounting plate extending downwards towards a central hub 40, as shown in FIG. 1. Each side frame 30A and 30B may have a proximal end 31 and a distal end 32, as shown in FIG. 5. The proximal end 31 may be secured to the mounting plate 10 using a plurality of fasteners. The distal end of side frame 30B may be secured to a central hub 40. In some exemplary embodiments, each side frame 30 may also have at least two openings for receiving the fasteners for attachment to the central hub 40.

Figure 6:
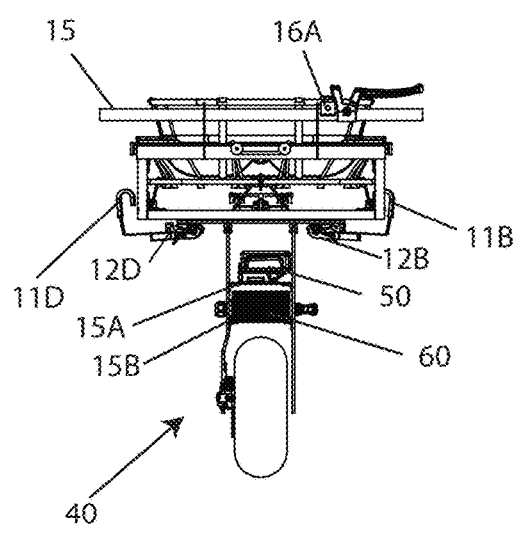
FIG. 6 provides a first end view of the gurney system, according to an embodiment of the present invention.
Figure 7:
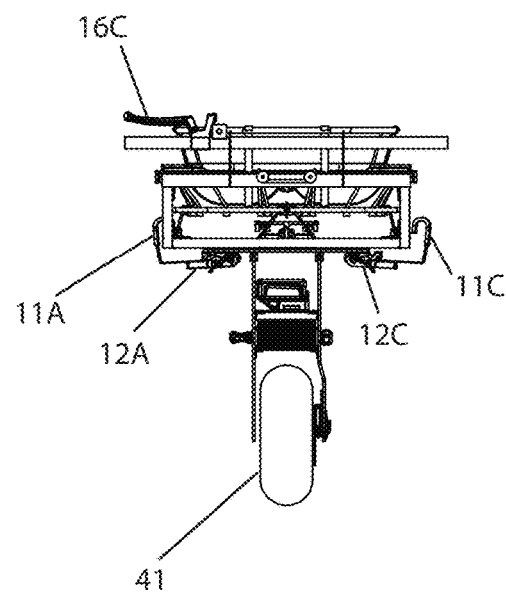
FIG. 7 provides a second end view of the gurney system, according to an embodiment of the present invention.
Figure 8:
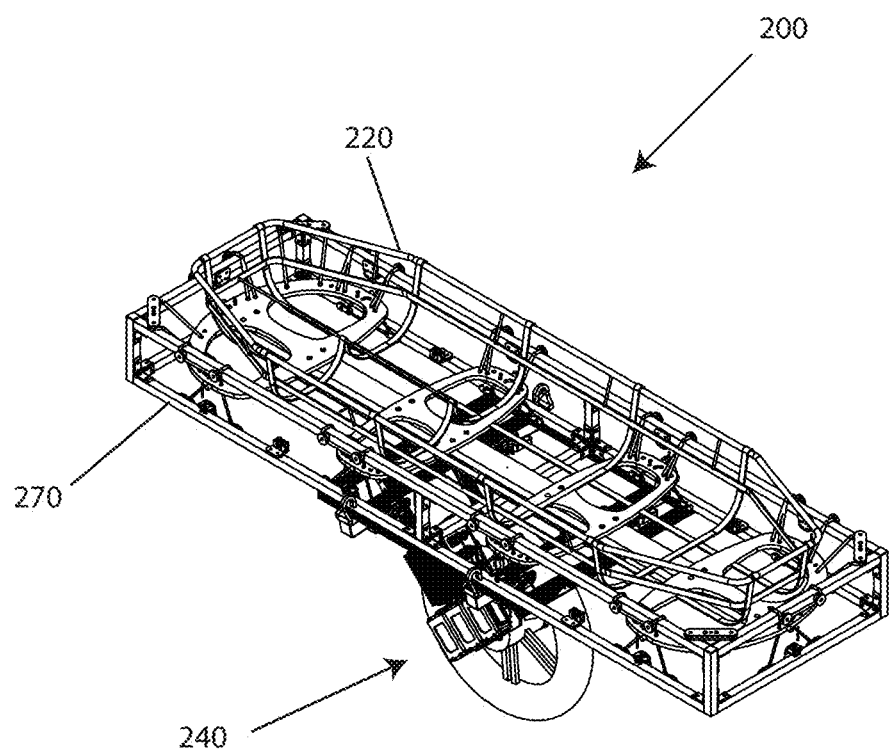
FIG. 8 provides a perspective view of a gurney system, according to an embodiment of the present invention.
Figure 9:
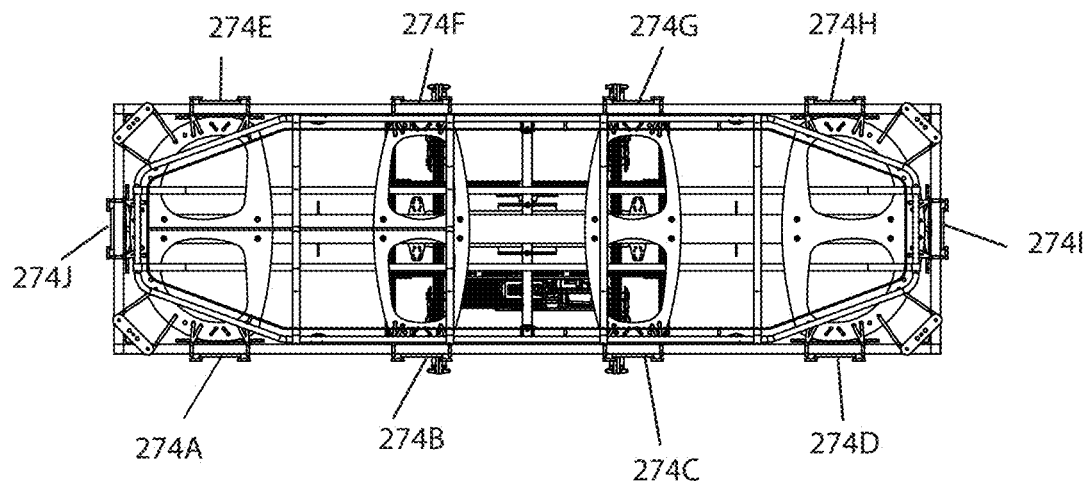
FIG. 9 provides a top view of the gurney system, according to an embodiment of the present invention.
Figure 10:
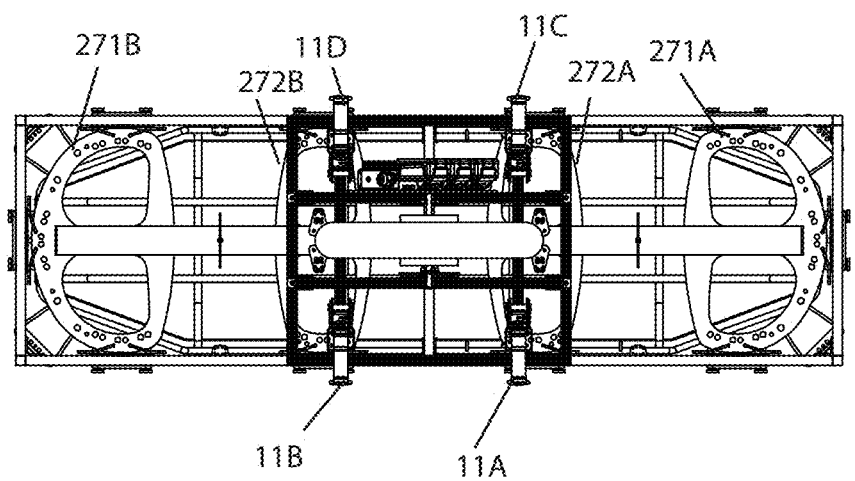
FIG. 10 provides a bottom view of the gurney system, according to an embodiment of the present invention.

In some embodiments, side frames 30 (30A-30B) may have a V-shaped configuration with a narrow thickness. At one end, each side frame 30 may extend downwards from the bottom surface 10A of the mounting plate. Side frames 30 (30A-30B) may be interconnected using a plurality of plates 15 (15A-15B), as shown in FIGS. 6-7. In such embodiments, side frames 30 may be held in alignment, and each plate 15 may be positioned above the wheel 41. Plate 15A may be operable to receive a battery shelf assembly 50, and plate 15B may be operable to receive a motor controller 60.

The litter 20 may be designed to receive and securely hold an injured person. More specifically, the litter 20 may be configured with a longitudinal and elongated shape having a contoured surface operable to receive an individual in a resting position. There may also be a side rail 21 around the perimeter of the litter 20. The side rail 21 may be operable to prevent injured persons from falling out of the litter 20 during movement of the gurney system 100. In some exemplary embodiments, the side rails 21 may include grip or support structures to assist in traversing the gurney system 100 over uneven surfaces.

Materials used to construct the litter may vary depending on the weight distribution of the injured person and the conditions of the traversal. In most embodiments, the materials chosen for the litter 20 may be used to improve durability, biocompatibility, and ease of cleaning. Some examples of materials used for the litter 20 may include aluminum, stainless steel, carbon fiber, high-density polyethylene, titanium, and the like.

The suspension frame 70 may be operably designed as a rectangular cage having a support bracket 78, a center bracket 79, first supporting plates 71, second supporting plates 72, a plurality of support brackets 76, a plurality of dampers 74 positioned around the perimeter of the frame 70, and a plurality of brackets 77 positioned at each corner of the frame 70, as shown in FIGS. 15-18. In other embodiments, the suspension cage 70 may have a varying geometry.

Figure 16:
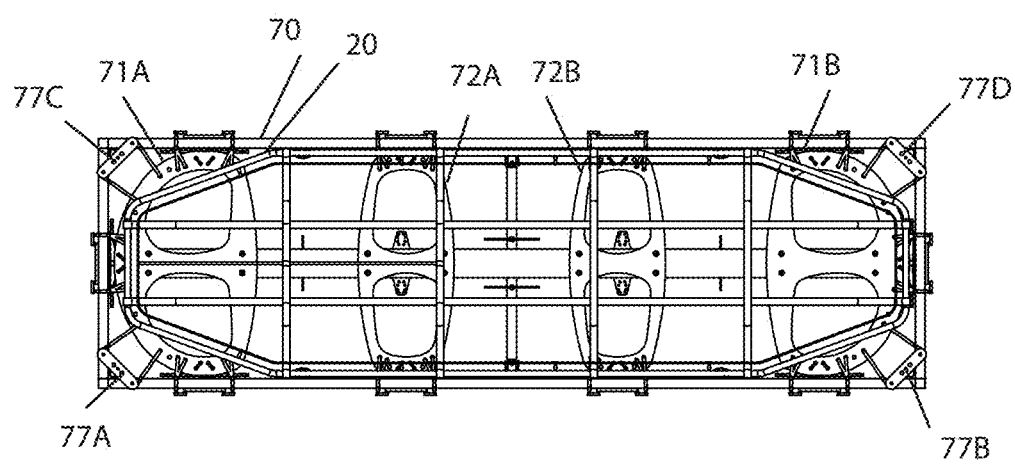
FIG. 16 provides a top view of the suspension system and litter, according to an embodiment of the present invention.
Figure 17:
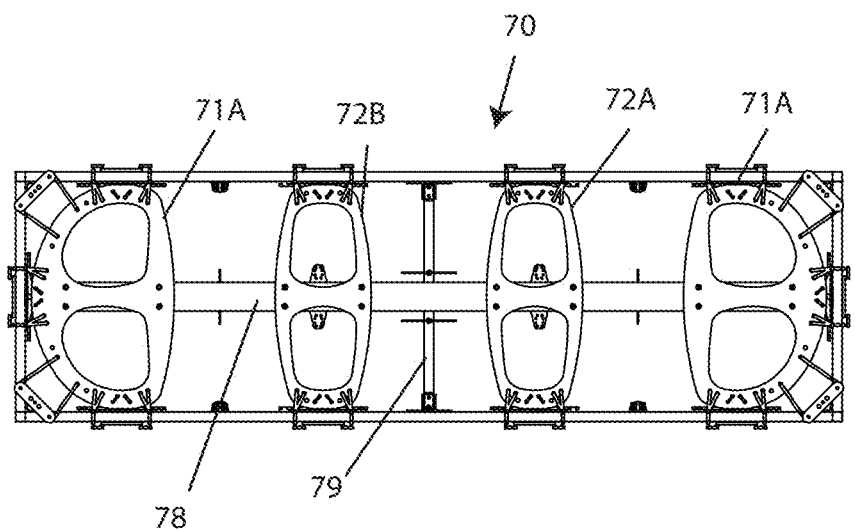
FIG. 17 provides a top view of the suspension system, according to an embodiment of the present invention.
Figure 18:
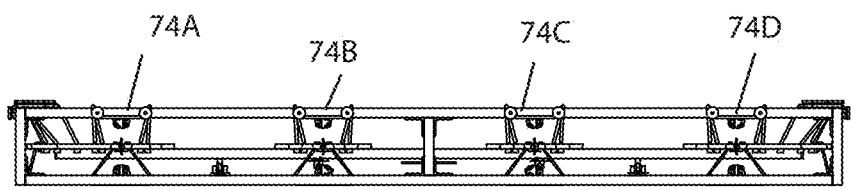
FIG. 18 provides a side view of the suspension system, according to an embodiment of the present invention.

In some embodiments, the suspension frame 70 may include a pair of first supporting plates 71 and a pair of second supporting plates, each being operable to provide additional strength and rigidity to the suspension system 70, as shown in FIGS. 16-17. The first supporting plates 71 (71A-71B) may be positioned at opposite ends of the suspension frame 70, and the second supporting plates 72 (72A-72B) may be positioned equidistant from the center of the frame 70.

In some embodiments, the suspension frame 70 may be constructed from a plurality of materials to improve strength, durability, and supporting weight. Some examples of materials used for the frame 70 may include aluminum, titanium, stainless steel, carbon fiber, and the like.

In some embodiments, there may be a plurality of dampers 74 (74A-74I) positioned around the perimeter of the suspension frame 70, as shown in FIGS. 2-7. Each damper 74 may be connected to a different supporting plate on the suspension frame 70. The first supporting plates 71 may be operably connected to at least three dampers, and the second supporting plates 72 may be connected to at least two dampers. Therefore, the suspension frame 70 is operable to absorb vibrations along the x, y, and z axes, thereby managing the forces from each direction, maintaining the orientation of the litter 20 during movement of the gurney system 100. In such embodiments, the suspension frame 70 is critically damped, protecting injured persons from oscillation during travel across rough surfaces or terrain.

In some exemplary embodiments, there may be a plurality of brackets 77 positioned at each corner of the frame 70. Each bracket 77 (77A-77D) may anchor the dampers 75 to the frame 70, thereby mechanically connecting the frame 70 to the supporting plates 71 via dampers, thereby enabling the litter 20 to move dynamically within the frame 70 to reduce the vibrations experienced by the litter 20 and a person positioned therein. The use of multiple types of dampers allows for reducing energies generated by different types motions by the gurney system 100. For example, roller dampers 74A-74D allow for the dissipation of energy created by an abrupt stop in forward progress (e.g., by running into an obstruction). As a further example, the dampers 75 may reduce energies in vertical and/or oblique directions (e.g., caused by rolling into a rut or pothole).

There may be at least 10 dampers positioned around the perimeter of the suspension frame 70. Therefore, the suspension frame 70 may be operable to manage rotational motion of the litter 20 across pitch, roll, and yaw, thereby protecting the litter from excessive vibrations and tilting. Examples of dampers used within the system may include roller dampers, hydraulic dampers, elastomeric dampers, viscoelastic dampers, spring dampers, magnetic dampers, and the like. In the embodiment shown in FIGS. 2-3, the suspension frame 70 may fitted with a plurality of types of dampers, including elastomeric dampers 75 and roller dampers 74A-74D.

Figure 3:
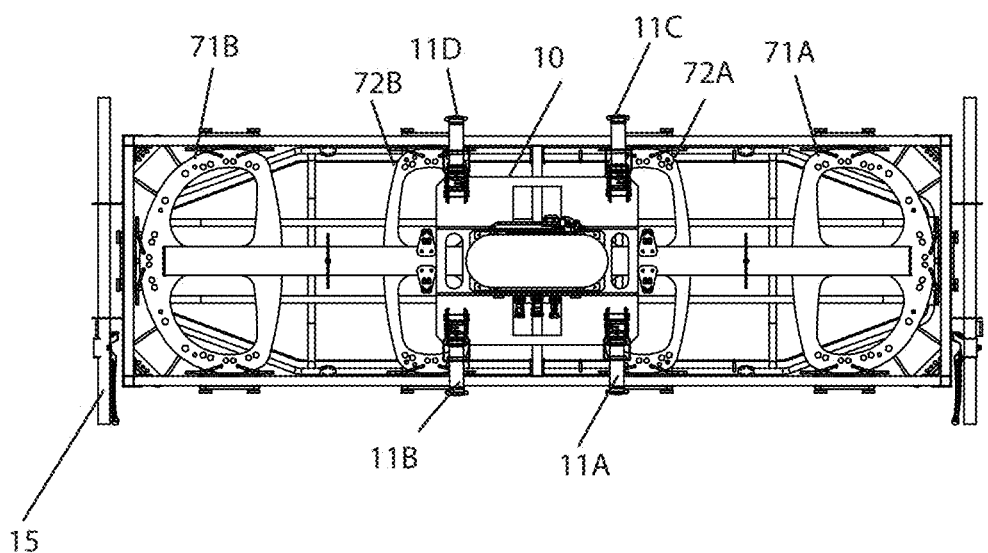
FIG. 3 provides a bottom view of the gurney system, according to an embodiment of the present invention.
Figure 4:
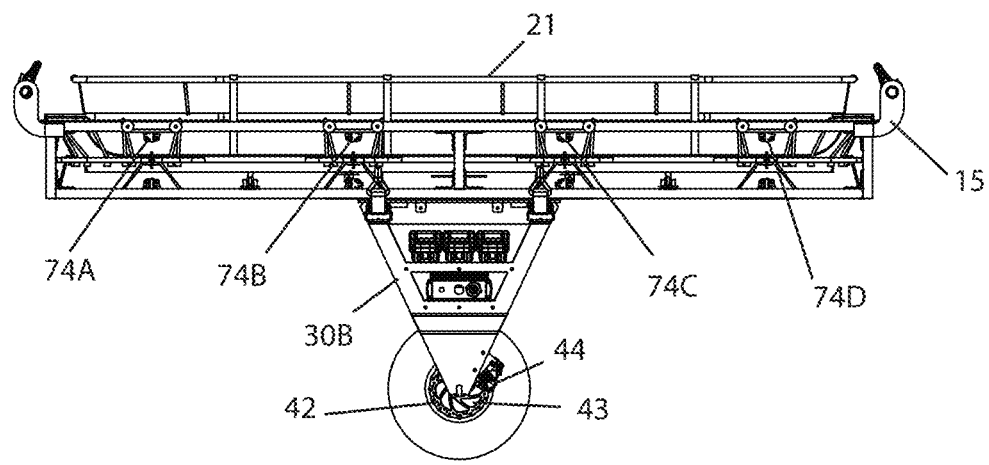
FIG. 4 provides a first side of the gurney system, according to an embodiment of the present invention.

In some embodiments, there may be a plurality of ratchet straps 11 positioned around the perimeter of the mounting plate 10, as shown in FIG. 3. Each ratchet strap (11A-11D) may be operable to secure a person being transported within the litter 20. Ratchet straps 11 may be adjustable, allowing the user to tighten or loosen the straps based on the size and condition of the injured person. In some exemplary embodiments, each ratchet strap 11 may be threaded through a ratchet mechanism 12 (12A-12D) allowing for tension control, thereby providing quick fastening or release when required.

In some embodiments, there may be a handle 15 connected to the litter 10, as shown in FIGS. 2-5. Handle 15 may include a plurality of controls 16 operable to move the gurney system 100 in a plurality of directions. For example, there may be a directional switch 16A, a throttle lever 16B, and a brake lever 16C. Each of the control switches (16A-16C) may be in electrical communication with a motor controller 60. In some exemplary embodiments, there may be at least two handles 15 on opposite sides of the suspension frame 70, as shown in FIG. 1. Each handle 15 may include a plurality of controls operable to control the gurney system 100.

The motor controller 60 may be operably in communication with the central hub 40. In particular, the motor controller may be electrically connected to the motor 43 within hub 40, thereby allowing the system 100 to travel in forward, reverse, and other directions. In some embodiments, the motor controller 60 may have a central processor (not shown) operable to receive program instructions.

The central hub 40 of the assembly 100 may include a tire 41, a brake rotor 42, a motor 43, and a brake caliper 44, as shown in FIGS. 4-7. In most embodiments, there may be a single tire 41 within gurney system 100. The tire 41 may be operable to support and propel the gurney system 100 over a plurality of uneven surfaces. Some examples of tires 41 used within system 100 may include pneumatic tires, solid rubber tires, all-terrain tires, foam-filled tires, and the like.

In some embodiments, the brake rotor 42 and brake caliper 44 may be operable to slow down or stop system 100 from moving, thereby providing users of the system with increased safety during operation. More particularly, the brake rotor 42 may be operable to rotate alongside the wheel, spinning at the same speed as the wheel. The brake caliper 44 may be mounted over the rotor 42 and may include brake pads. When the caliper 44 is engaged, the brake pads (not shown) may be operably forced on the rotor 42, creating friction and slowing down the rotation of the rotor 42, thereby slowing the tire 41. Examples of brake rotors 42 compatible with the system 100 may include disc brake rotors, drum brake rotors, electromagnetic brake rotors, and the like.

The motor 43 may be operable to drive the system 100, and more particularly operable to drive the tire 41, thereby allowing the system 100 to move in forward, reverse, and other directions. Examples of motors 43 used within the system 100 may include gearhead motors, brushless DC motors, servo motors, and the like. In most embodiments, system 100 may include a gear head motor 43 with a gear reduction system. In such embodiments, the gear reduction system 80 (e.g., planetary gear train) may be operable to reduce the rotational speed of the motor while proportionally increasing the torque output. For example, the gear reduction system 80 may include a plurality of gears with different sizes, where the motor's high-speed, low-torque input is converted into low-speed, high-torque output, or a combination of gears such as a planetary gear. In such embodiments, the gear reduction system 80 may be operable to increase the motor torque to drive the system 100 over rough or uneven terrain, steep inclines, or other challenging environments while maintaining smooth and controlled motion.

Figure 19:
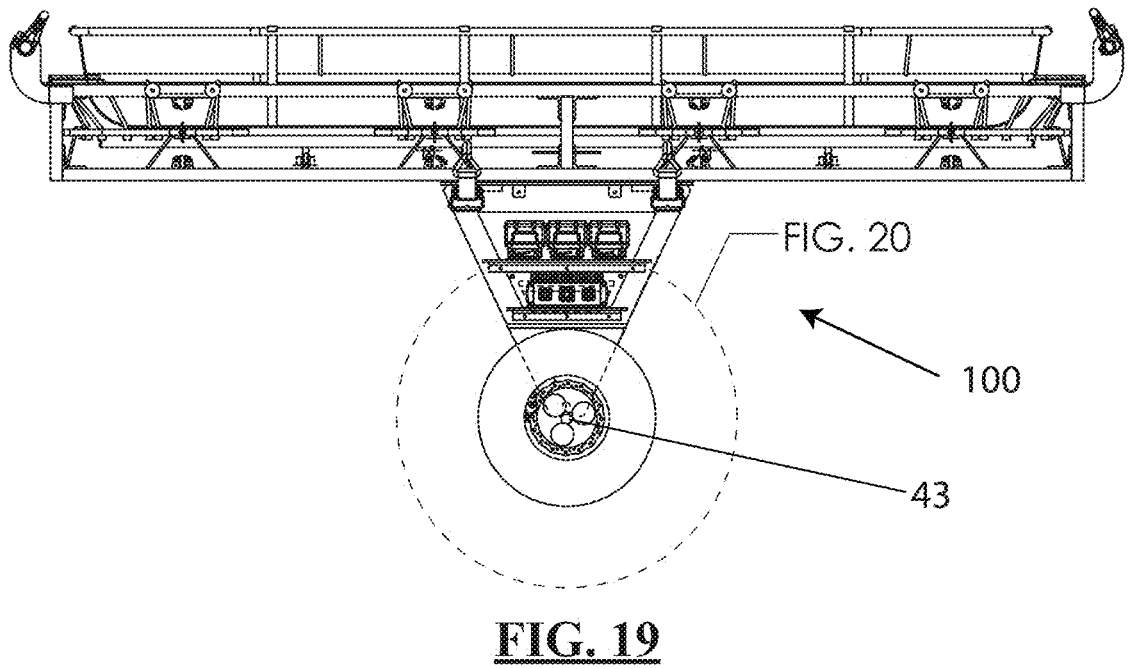
FIG. 19 provides a side view of the gurney system with a side frame removed, according to an embodiment of the present invention.
Figure 20:
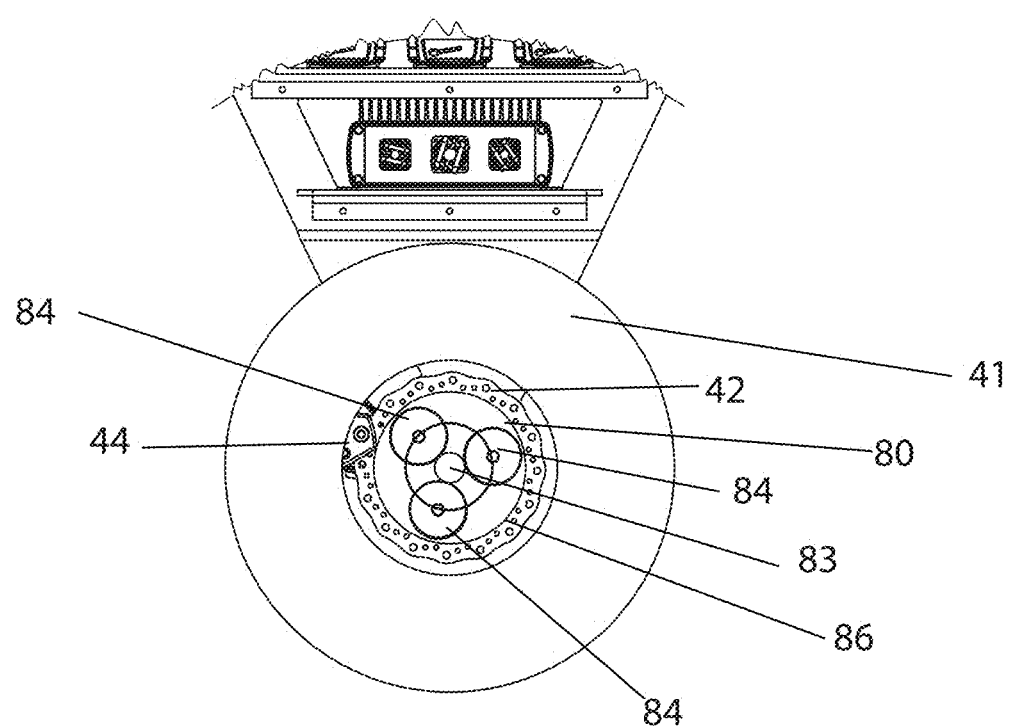
FIG. 20 provides a close-up view of the wheel motor and geartrain of the gurney system of FIG. 19, according to an embodiment of the present invention.

In some embodiments, as illustrated in FIGS. 19-20, the planetary gear train 80, which may be connected to both the input shaft of the motor 43 and the wheel 41 in the system 100, and may be operable to efficiently control the speed and torque. In such embodiments, the planetary gear train 80 may include a central sun gear 83, planet gears 84 revolving around the sun gear 83, and a ring gear 86 encircling the planet gears. The sun gear 83 may receive the input from the motor's shaft, while the planet gears 84 may transmit motion to the ring gear 86, which may be connected to the wheel 41. The geartrain may allow the system 100 to distribute torque evenly and maintain control over rough terrains, steep inclines, and varying environmental conditions. The planetary gear train 80 may enable high torque output while reducing motor speed, thereby ensuring smooth, controlled movement of the system 100.

In such embodiments, the planetary gear train 80 may be configured in a compact size, high torque-to-weight ratio, and ability to handle significant loads, and may be operable to allow for more efficient use of the motor's power by converting high-speed, low-torque input into low-speed, high-torque output, which may be essential for traversing uneven surfaces. Planetary gear trains 80 may offer various configurations, such as adjusting the number of planet gears or altering the gear ratios to optimize performance for specific conditions. For example, a higher gear ratio may be implemented to increase torque when climbing steep inclines, while a lower ratio may be preferable for faster movement across smoother terrain.

In some embodiments, the motor 43 may be operable to drive the system 100 at a plurality of speeds. For example, the motor 43 may adjust its rotational speed in response to signals received from the throttle lever 16B, allowing the user to control the speed of the gurney system 100 based on the terrain or urgency of the situation. The speed may range from a low setting for careful maneuvering over rough or uneven surfaces, to a higher setting for faster movement over smooth, unobstructed terrain. In such embodiments, the speed of the motor may enable a range forward motion of between 0 mph to 10 mph. In other embodiments, the system 100 may travel at different speeds.

In some embodiments, the motor controller 60 may be operably in communication with the controls 16 (16A-16C). More particularly, the motor controller 60 may be operable to receive signals from controls 16, thereby directly adjusting the speed and direction of the motor. For example, if the user activates the directional switch 16A, the motor controller 60 may define a selected direction. The selected direction may determine the rotation of the motor 43 either being clockwise or counterclockwise. Once the throttle lever 16B is pressed, the motor controller 60 may operably adjust the speed of the motor 43 in the selected direction, thereby turning the tire 41 and moving the system 100. Similarly, if the brake lever 16C is pressed, the motor controller 60 may activate the brake caliper 44 to stop the system 100 from moving further. In such embodiments, the motor controller 60 may be an electronic speed controller (ESC). Some other examples of motor controllers 60 may include PWM controllers, PLCs, stepper motor controllers, servo motor controllers, microcontrollers, and the like.

The motor 43 may be operable to provide a torque rating sufficient to traverse rough surfaces and challenging environments, such as uneven terrain, gravel, mud, or inclines. The motor's torque output may be designed such that the gurney system 100 may maintain steady and controlled movement even under demanding conditions, such as when carrying a fully loaded litter 20 with an injured person. The high torque capability may allow the system 100 to overcome resistance from obstacles like rocks, dips, or debris, while also maintaining smooth operation over soft or loose surfaces like sand or dirt. For example, in such embodiments, the motor 43 may be operable to provide a torque output ranging between 150 Nm to 600 Nm.

The motor controller 60 may be powered by a plurality of batteries 51 within the battery shelf assembly 50. In most embodiments, there may be at least three batteries operable to power the motor controller 60, and the motor 43. Examples of batteries used within the battery shelf assembly 50 may include Milwaukee batteries, DeWalt lithium-ion batteries, Bosch, Makita, and the like. The battery shelf assembly also includes a versatile power supply configuration, allowing connections for power accessories through multiple connection types, such as USB-A, USB-B, USB-C, and micro-USB, as well as barrel connectors. This setup enables the integration of various auxiliary devices, including flood and head lights to enhance night-time maneuverability and visibility, GPS locators to relay positional data back to a command post, warming blankets for patient care, and charging ports for other peripherals.

Furthermore, the battery supply is designed with a redundant configuration to ensure uninterrupted operation. In the event of battery depletion or failure, the system can continue operating on reduced power with only one or two batteries as needed, providing enhanced reliability and extended operational time under demanding conditions. This redundancy not only supports continuous function in critical applications but also offers flexibility in power management, accommodating varying power demands depending on the accessory load and operational requirements.

The system may include a robust battery redundancy system within the battery shelf assembly 50 to allow for continuous functionality and extended operational time, even if individual batteries deplete or fail. This system can operate in either a parallel or series-parallel configuration, providing flexibility in power management. In a parallel arrangement, each battery is connected across the same voltage level, allowing current to flow simultaneously from all batteries; if one battery fails, the remaining batteries continue to supply power without interruption. In a more complex series-parallel configuration, batteries are paired in series to double the voltage, and each pair is connected in parallel to maintain redundancy. In this setup, if one pair fails, the other pairs still provide functional voltage and current, ensuring operational continuity.

The wiring setup may incorporate diode isolation for each battery, preventing reverse current flow and eliminating backfeed into depleted batteries, which enhances both efficiency and protection against power loss. Additionally, an automatic battery switch system, such as MOSFET-based switches, can detect when a battery drops below a specific charge level and reroute the power supply to bypass that battery, ensuring only functional batteries continue to supply power. This switch system can be managed by a Battery Management System (BMS) or the controller, which enables precise monitoring and control of the entire power setup.

The controller may monitor each battery voltage, temperature, and overall health, and it manages load balancing to prevent excessive draw from any one battery. When a battery reaches a low charge threshold, the controller may automatically isolate it from the network and reroutes power from the remaining batteries, ensuring minimal disruption in power delivery.

In some exemplary embodiments, the gurney system 100 may include a stability assistance system. The stability assistance system may be operable to maintain the orientation of the litter 20 while traveling across rough surfaces. The stability assistance system may include a plurality of sensors operable to stabilize the litter 20 when traveling over rough surfaces. These sensors may include but not limited to, gyroscopes, accelerometers, angle sensors, and the like. Each sensor may be operable to determine the appropriate positioning and angle relative to the surface on which the gurney system 100 is traveling. For example, when moving the gurney system 100 at higher speeds using motor 43, the stability assistance system may be operable to keep the litter upright relative to the ground, meaning that the bottom surface 10A of the mounting plate 10 may be horizontally aligned with the ground surface.

The gurney system 100 may be operable to receive an injured person. The injured person may be placed within the litter 10, and may be secured using the plurality of ratchet straps (11A-11D) placed around the perimeter of said litter. Once the injured person is secure, the directional switch 16A may be toggled, indicating the direction of traversal of the system 100. The motor controller 60 may receive the signal sent by the directional switch 16A, thereby indicating the direction of traversal. The throttle lever 16B may be toggled to move the system 100 in the selected direction, thereby transporting the injured person towards a rescue location. In such embodiments, the direction of traversal may include a forward direction away from support plate 71B, and a reverse direction away from the support plate 71A.

In some exemplary embodiments, there may be a gurney system 200 with a suspension frame 270 operable to support a litter 220, and a central hub 240, as shown in FIGS. 8-14. The central hub 240 may be powered by a battery shelf assembly 50 and may be operably controlled through a motor controller 60.

Figure 11:
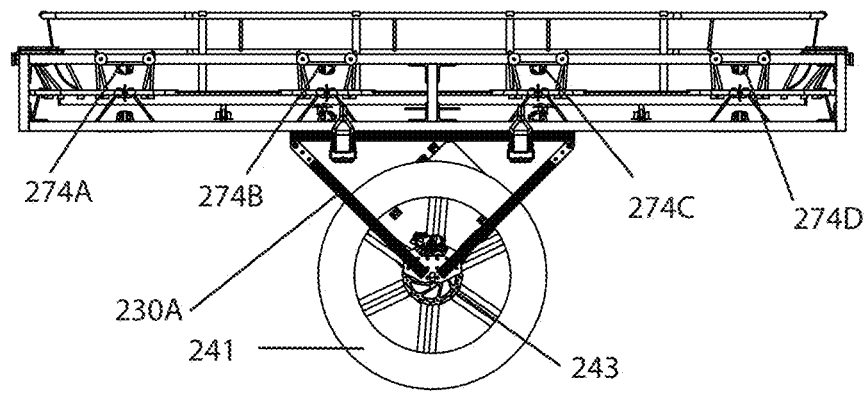
FIG. 11 provides a first side view of the gurney system, according to an embodiment of the present invention.
Figure 12:
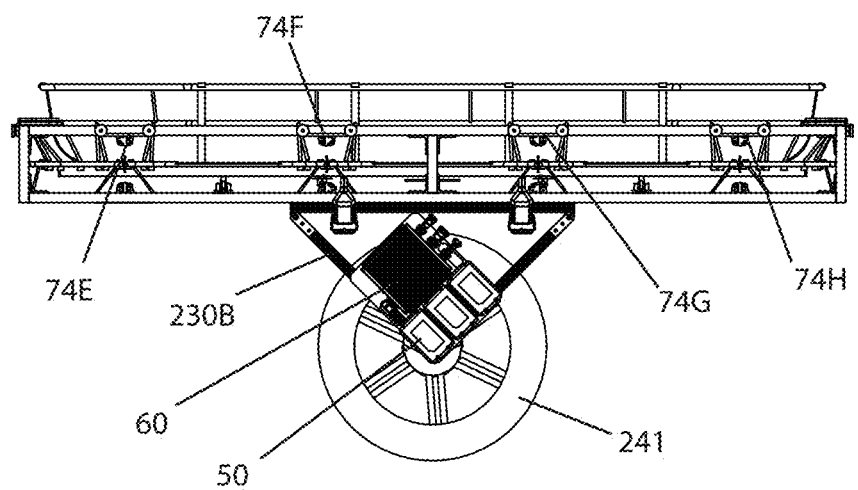
FIG. 12 provides a second side view of the gurney system, according to an embodiment of the present invention.
Figure 13:
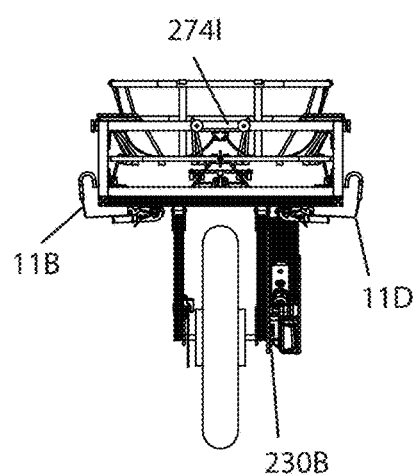
FIG. 13 provides a first end view of the gurney system, according to an embodiment of the present invention.
Figure 14:
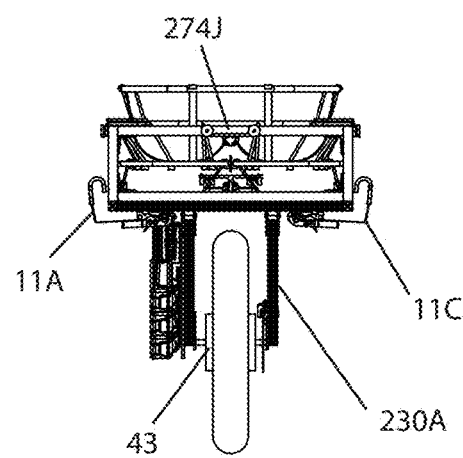
FIG. 14 provides a second end view of the gurney system, according to an embodiment of the present invention.
Figure 15:
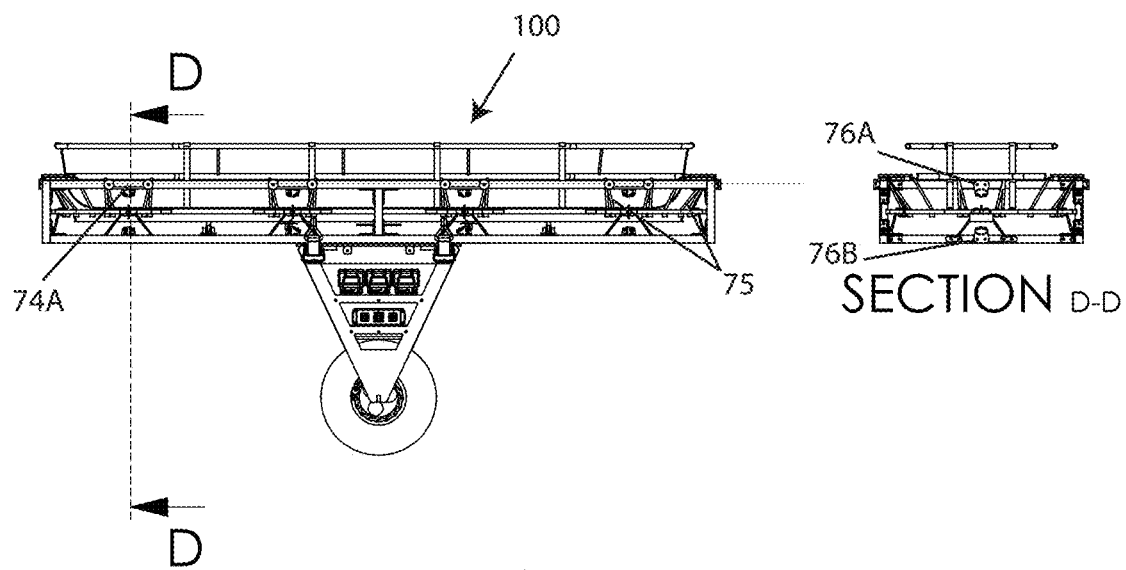
FIG. 15 provides a cross sectional view of the gurney system, according to an embodiment of the present invention.

The central hub 240 may be connected to the suspension frame 270 through a pair of side frames 230 laterally extending downwards from the frame 270. Each side frame 230 may have a V-shaped configuration and may be directly engaged with the wheelbase of the tire 241, as shown in FIGS. 11-12. In such embodiments, the battery shelf assembly 50 and the motor controller 60 may be mounted to at least one of the side frames 230B. More specifically, both the battery shelf 50 and the motor controller 60 may be positioned at the intersection of the side frames 230 and the central hub 240, thereby allowing the system 200 more flexibility in traversal. The remaining features of gurney system 200 may be consistent with the embodiment shown in FIGS. 1-7.

In some embodiments, the gurney system 100 may be configured to transport a patient. The gurney system 100 may have a tire 41 mounted to a planetary gear hub 80 forming a motor wheel assembly 43. A litter support frame 70 may be joined to the motor wheel assembly 43. A battery 51 may be joined to the motor wheel assembly 43 with a motor controller 60. A brake rotor 42 and a brake caliper 44 may be joined to the planetary gear hub 80 and the litter support frame 70. Handles 15 may be joined to the litter support frame 70. A brake lever 16C, a forward and reverse switch 16A, and throttle levers 16B may be joined to the handles 15, the motor controller 60, and the brake caliper 44. A litter 20 may be joined to the litter support frame 70 with a litter mount 10. A patient secured to the litter 20 may be moved by using the brake 16C and throttle levers 16B.

The planetary gear hub motor 80 and tire 41 assembly may be attached to the litter support frame 70. The battery 51 and motor controller 60 may be connected and mounted on the litter support frame 70. The appropriate electrical connections from the planetary gear hub motor 80 to the motor controller 60 may be made. The brake rotor 42 may be mounted on the outside casing of the gear hub motor 80 and may be surrounded by the brake caliper 44, which may be mounted on the litter support frame 70. The brake caliper cable may be routed into the brake lever 16C and mounted on the handles 15. The throttle 16B may be mounted on the handles 15 as well. Appropriate electrical connections between the throttle 16B and brake lever 16C may be made to the motor controller 60. The litter 20 may then be mounted on top of the litter support frame 70 through the frame to litter mounting system 10. Turning power on to the motor controller 60 may put the system into its active mode. Enabling the throttle 16B may send a command signal to the motor controller 60, which then may send the appropriate signals to the gear hub motor 80 to cause it to rotate. The motor shaft may be integrated into a planetary gear system 80 with varying reduction ratios depending on the application. The planetary gear system 80 may increase the torque output and reduce speed on the wheel 41 to appropriate levels. The full effect of activating the throttle 16B may cause the tire wheel assembly 41 to rotate and produce a force that enables the movement of the litter 20 load that is mounted on the litter support frame 70. The wheel assembly 41 may rotate in a clockwise or counterclockwise direction through the enabling of the forward/reverse switch 16A. The speed at which the wheel 41 rotates may be controlled through the use of the throttle position 16B. Pressing the brake lever 16C may send a signal to the motor controller 60 telling it to stop movement of the planetary gear hub motor 80. As this brake lever 16C is pressed, it may also pull on the brake cable, causing the brake calipers 44 to clamp on the brake rotor 42, holding the motor wheel assembly 43 in position.

The planetary gear hub motor 80 and tire wheel assembly 41 shafts may be mounted to the support frame's forks 70. The brake caliper 44 may be mounted on the support frame 70 and may surround the rotor 42 that may be attached to the gear hub motor tire wheel assembly 41. The motor controller 60 and battery 51 may be mounted to the support frame 70 as well. The battery 51 and motor controller 60 may be connected using the appropriate wiring connections. The wiring connections between the planetary gear hub motor 80 and the motor controller 60 may also be made using the appropriate wiring. The brake lever 16C, throttle 16B, and forward/reverse switch 16A may be mounted to the handles 15. The appropriate wiring connections between the brake lever 16C, throttle 16B, and forward/reverse switch 16A to the motor controller 60 may also be made. The cable between the brake lever 16C and caliper 44 may be attached to actuate the braking mechanism. The litter 20 may then be mounted to the litter support frame 70 using the frame to litter mount 10.

In the event of a rescue requiring the patient to be transported in rough and/or steep terrain that may require a lot of manual power from the rescue party, this system may enable the use of a motorized wheel 41 to assist in the gurney of the patient in a litter 20, decreasing exhaustion for the rescue party and enabling fast and safe extrication. One may assemble the system by mounting the planetary gear hub motor 80 and tire/wheel assembly 41 to the litter support frame 70. The litter support frame 70 may have the battery 51 and motor controller 60 mounted on it. Quick electrical connectors to the motor 43 may be made in the field. If the patient is located far from the assembly location, one may pre-mount the litter 20 onto the support frame 70, as well as the handles 15 that include the levers 16 and switches 16A-16C. Power may then be turned on, and the assembly driven to the location of the patient. This may be done by maneuvering the acceleration lever 16B and ensuring the forward/reverse switch 16A is in the correct position. If the system needs to be slowed down or stopped, the user may utilize the brake lever 16C, which may turn off power to the motor 43 while also clamping down the caliper 44 onto the brake rotor 42, causing the system to slow down or stop in place. Once at the patient's location, the litter 20 may be detached and placed on the ground. The patient may then be placed onto the litter 20 and strapped in appropriately if needed. The litter 20 and patient may then be mounted to the litter support frame 70 using the frame to litter mount 10, ensuring a strong connection to the litter support frame 70. Once the litter 20 and patient are situated appropriately onto the frame 70, one may use the throttle lever 16B to apply power to the planetary gear hub motor 80, causing the movement of the patient and assembly 100 as a whole. The brake lever 16C and forward/reverse switch 16A may be used as needed to transport the patient in a safe and secure manner to the final location. The handles 15 may be mounted onto the litter 20 for better maneuverability and control of the system. Additional rescue personnel may walk/hike alongside the system to help stabilize it and assist as needed.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A motorized gurney system for transporting an injured person, comprising:
   a. a suspension frame operable to support a litter for securing the injured person;
   b. a wheel and a central hub including a planetary gear system, a motor, and a braking system within the central hub that selectively disengages the planetary gear system, the central hub configured to propel the gurney system across multiple terrains; and
   c. a plurality of dampers positioned around a perimeter of the suspension frame, the dampers operable to absorb vibrations along multiple axes to stabilize the litter.

2. The system of claim 1, further comprising
   a. a motor controller in electronic communication with the motor; and
   b. controls located on handles connected to the suspension frame, the controls operable to adjust speed, direction, and braking of the gurney system.

3. The system of claim 1, wherein said plurality of dampers includes roller dampers.

4. The system of claim 1, wherein said plurality of dampers are connected to either of a pair of first supporting plates or a pair of second supporting plates in said suspension frame, wherein motion of said injured person in said litter is independent of said vibrations generated by the wheel traveling over uneven terrain.

5. The system of claim 4, wherein said plurality of dampers includes elastomeric dampers connecting said support plates to said suspension frame.

6. The system of claim 1, wherein said motor is operable to provide a torque rating ranging between 100 Nm to 300 Nm.

7. The system of claim 1, wherein the planetary gear system is operable to vary torque output for traversing different terrains, including gravel, sand, and inclines.

8. The system of claim 1, further comprising a stability assistance system including gyroscopes and accelerometers to maintain the litter's horizontal alignment.

9. A motorized gurney system for transporting injured persons over rough terrains, comprising:
   a. a suspension frame including first and second supporting plates and a plurality of dampers positioned to absorb vibrations along x, y, and z axes;
   b. a litter within the suspension frame, the litter having a contoured surface and perimeter side rails to secure an injured person;
   c. a central hub comprising a tire, a motor, a braking system, a planetary gear train, and wheel in mechanical connection with the planetary gear train, wherein the braking system is operable to selectively disengage the planetary gear system; and
   d. a directional switch, throttle lever, and brake lever on handles connected to the suspension frame, the levers and switch electronically connected to a motor controller to adjust motion, speed, and braking of the gurney system.

10. The device of claim 9, wherein said planetary gear train is operable to adjust torque output based on terrain conditions.

11. The device of claim 9, further comprising a battery shelf assembly mounted in said central hub, said battery shelf assembly operably in communication with said motor controller.

12. The device of claim 9, wherein the braking system is integrated into the central hub, and comprises a brake rotor and caliper connected to a brake lever on the handles.

13. The device of claim 9, wherein said plurality of dampers are connected to said pair of first supporting plates and said pair of second supporting plates.

14. The device of claim 9, wherein said plurality of dampers includes roller dampers.

15. The device of claim 9, wherein said plurality of dampers are connected to either of said pair of first supporting plates or said pair of second supporting plates in said suspension frame.

16. The device of claim 9, wherein said plurality of dampers includes elastomeric dampers connecting said support plates to said suspension frame.

17. A method of operating a gurney system, the method comprising:
   a. selecting a direction of travel with a directional switch located on handles attached to the suspension frame, the directional switch in electronic communication with a motor controller;
   b. activating a throttle lever on the handles to transmit a control signal from the motor controller to a motor within a central hub, wherein the motor drives a planetary gear system operably coupled to a tire to provide variable torque output for controlled movement of the gurney system over different terrains;
   c. using a braking mechanism within the central hub to selectively disengage the planetary gear system, thereby preventing unintended motion;
   d. absorbing multidirectional vibrations experienced by the gurney system during movement through a plurality of dampers arranged along a perimeter of the suspension frame, each damper configured to reduce oscillations along x, y, and z axes, enhancing stability for the injured person.

18. The method of claim 17, further comprising the step of adjusting the planetary gear system to increase torque output in response to inclines or uneven surfaces, enhancing traction and stability of the gurney system.

19. The method of claim 17, wherein the plurality of dampers includes elastomeric and viscoelastic dampers positioned to absorb both vertical and lateral vibrations caused by rough terrain, maintaining orientation of a litter supported by the suspension frame.

20. The method of claim 17, wherein said plurality of dampers includes roller dampers that are in mechanical engagement with said frame and absorb energy along an axis that is parallel with the direction of travel.

* * * * *